United States Patent
Huang

(10) Patent No.: US 11,035,444 B2
(45) Date of Patent: Jun. 15, 2021

(54) THREAD ROD ASSEMBLY WITH AN ADJUSTABLE AXIAL GAP

(71) Applicant: TRICORE CORPORATION, Taichung (TW)

(72) Inventor: Yu-Zhi Huang, Taichung (TW)

(73) Assignee: Tricore Corporation, Taichung (TW)

( * ) Notice: Subject to any disclaimer, the term of this patent is extended or adjusted under 35 U.S.C. 154(b) by 228 days.

(21) Appl. No.: 16/262,097

(22) Filed: Jan. 30, 2019

(65) Prior Publication Data

US 2019/0390750 A1    Dec. 26, 2019

(30) Foreign Application Priority Data

Jun. 22, 2018    (TW) .................................. 107121488

(51) Int. Cl.
*F16H 25/20*    (2006.01)

(52) U.S. Cl.
CPC ....... *F16H 25/20* (2013.01); *F16H 2025/204* (2013.01); *F16H 2025/2037* (2013.01)

(58) Field of Classification Search
CPC ............. F16H 25/20; F16H 2025/2037; F16H 2025/204; F16H 25/24
See application file for complete search history.

(56) References Cited

U.S. PATENT DOCUMENTS

| | | | | |
|---|---|---|---|---|
| 2,578,608 A * | 12/1951 | Shull | ................... | F16H 25/2025 74/89.23 |
| 3,540,698 A * | 11/1970 | Diffenderfer | ......... | B60T 17/221 254/100 |
| 4,100,850 A * | 7/1978 | Wolbrink | ................ | B30B 1/006 100/229 A |
| 4,854,844 A * | 8/1989 | Carlsen | .................. | B29C 48/313 425/141 |
| 5,477,598 A * | 12/1995 | Borner, Jr. | .......... | B25B 27/0035 254/10.5 |
| 5,537,275 A * | 7/1996 | Peace | ................... | G11B 5/5504 360/261.3 |
| 5,722,649 A * | 3/1998 | Morris | ...................... | B25B 1/12 269/171 |
| 5,912,520 A * | 6/1999 | Kobayashi | ............. | B29C 41/20 310/216.004 |
| 5,944,568 A * | 8/1999 | Rabal | ................... | B63H 20/106 440/53 |
| 6,029,331 A * | 2/2000 | Simmons | ............ | B25B 27/0035 254/100 |
| 6,132,271 A * | 10/2000 | Hebert | ................... | B63H 20/06 440/53 |
| 6,250,170 B1 * | 6/2001 | Hill | ........................ | F16H 25/20 254/103 |

(Continued)

*Primary Examiner* — Zakaria Elahmadi
(74) *Attorney, Agent, or Firm* — Muncy, Geissler, Olds & Lowe, P.C.

(57) ABSTRACT

An adjustable axial gap of the thread rod assembly has a brace, a thread rod rotationally deployed onto the brace, a thread bearing for gripping one end of the thread rod is screwed into the first positioning hole of the brace, and one side of the thread bearing withstands against the thrust washer. The user may rotate the thread rod by applying force passing through the thrust washer onto the thread rod and shifting an axial moving of the thread rod to adjust the axial gap of the thread rod assembly which attains the merits of simple installation and easy application.

7 Claims, 3 Drawing Sheets

(56) References Cited

U.S. PATENT DOCUMENTS

| | | | | |
|---|---|---|---|---|
| 7,421,768 B2* | 9/2008 | Chiang | B25B 11/02 | 269/43 |
| 7,488,110 B2* | 2/2009 | Lee | F16C 29/0609 | 384/45 |
| 7,706,083 B2* | 4/2010 | Saito | G02B 7/023 | 359/694 |
| 7,731,552 B1* | 6/2010 | Pelini | B63H 20/06 | 440/53 |
| 8,210,510 B2* | 7/2012 | Li | B25B 1/103 | 269/246 |
| 8,640,316 B2* | 2/2014 | Gentner | B25B 27/0035 | 29/257 |
| 9,156,151 B2* | 10/2015 | Kicher | B25B 27/30 | |
| 10,302,249 B1* | 5/2019 | Kelly | F16B 2/12 | |
| 2002/0101017 A1* | 8/2002 | Kolarik | B25B 27/10 | 269/43 |
| 2004/0061382 A1* | 4/2004 | Schreier | F16H 25/20 | 310/13 |
| 2004/0123438 A1* | 7/2004 | Kang | B25B 27/0021 | 29/239 |
| 2005/0178224 A1* | 8/2005 | Czarnek | F16H 25/24 | 74/89.23 |
| 2009/0206644 A1* | 8/2009 | Ishii | B60N 2/0232 | 297/362 |
| 2010/0013285 A1* | 1/2010 | Stanz | B60N 2/0232 | 297/344.13 |
| 2010/0115747 A1* | 5/2010 | Bilstein | B25B 27/04 | 29/256 |
| 2011/0061482 A1* | 3/2011 | Maruyama | F16H 25/2021 | 74/89.23 |
| 2011/0162468 A1* | 7/2011 | Lin | F16H 25/20 | 74/89.29 |
| 2015/0336475 A1* | 11/2015 | Hoffmann | B60N 2/06 | 297/344.1 |
| 2017/0009870 A1* | 1/2017 | Hoffmann | B60N 2/067 | |
| 2019/0107186 A1* | 4/2019 | Feitl | F16D 1/096 | |
| 2020/0040972 A1* | 2/2020 | Huang | F16H 25/24 | |

* cited by examiner

THREAD ROD ASSEMBLY WITH AN ADJUSTABLE AXIAL GAP

BACKGROUND OF THE INVENTION

Field of the Invention

This invention is directed to a transmission technique and, more specifically, to an adjustable axial gap of the thread rod assembly having the merits of simple installation and easy application.

Description of the Related Art

Thread rod acts as a ubiquitous element for transmission deployed on a base providing spiral movement. For making an accurate transmission, the thread rod is inserted with two nuts and buried in a spring placing between the nuts, either of the nuts depends on the base is under the thrust of the spring's resilience, and the user may regulate the distance between the nuts in order to adjust the axial gap for making a smooth and noiseless transmission.

Nevertheless, said nuts and springs existing another problems apart from the assembly difficulty, such as adding the redundant quantity of element means a higher cost of components and installation and is inapplicable to micro machinery.

SUMMARY OF THE INVENTION

This invention aims to provide a thread rod assembly with an adjustable axial gap, the thread rod assembly having the merits of simple installation and easy application.

Thence, this present invention disclose the thread rod assembly with an adjustable axial gap, comprises: a brace, having a first positioning hole with a spiral circumference; a thread rod, having a screw section and a thrust washer, and said thread rod passing through the first positioning hole and screwing into the brace; a thread bearing, being a hollow cylinder for gripping the thread rod and screwing onto one side of the first positioning hole, and the thread bearing, having an spiral periphery for matching to the spiral circumference of the first positioning hole and a bottom for withstanding against said thrust washer.

Thereby, the user rotates the thread bearing to be closer or farther toward the inner brace by applying force passing through the thrust washer onto the thread rod, and shifting an axial moving of the thread rod. The axial gap of the thread rod assembly is adjustable. The thread rod assembly is easy to assemble and operate because the required components is fewer, and the user can even do with bare hands.

DETAILED DESCRIPTION OF PREFERRED EMBODIMENTS

To be more explicitly addressing the invented structure and the realized technical efficiency, the figures will be referred accordingly. The embodiment of the thread rod assembly of this invention includes a brace 10, a thread rod 20 and a thread bearing 30, each of the component is individually elaborated as below.

Figure 1:
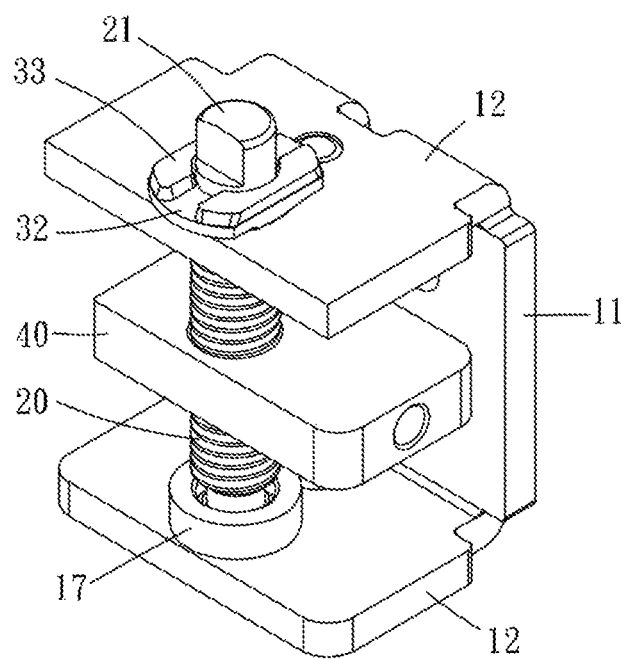
FIG. 1 is a perspective view in accordance with the embodiment of the present invention.
Figure 2:
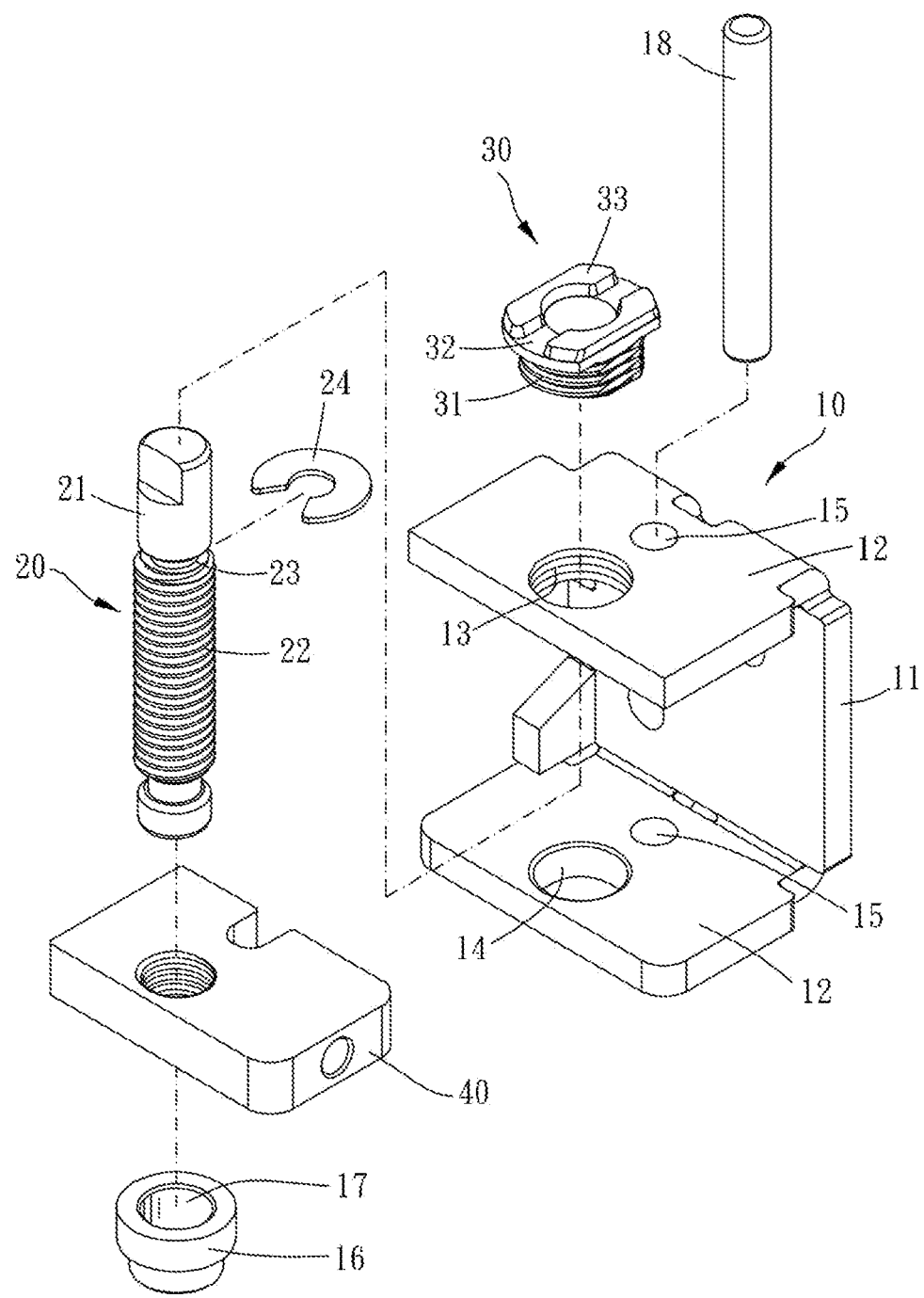
FIG. 2 is an exploded view in accordance with the embodiment of the present invention.
Figure 3:
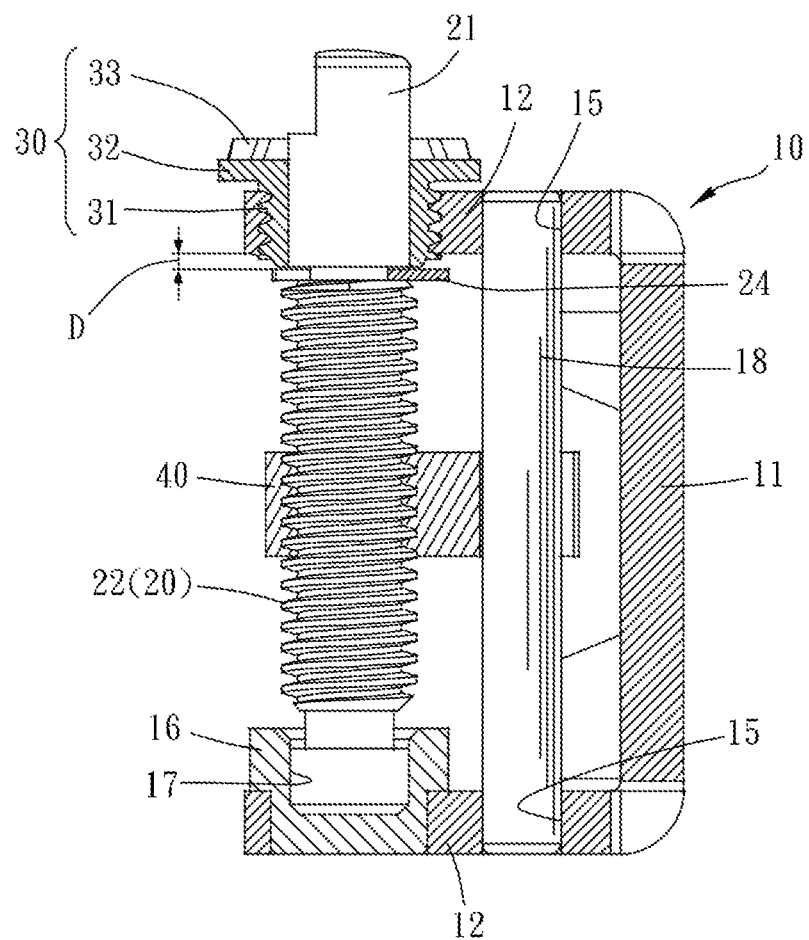
FIG. 3 is a cross-sectional view in accordance with the embodiment of the present invention.

The brace 10 has a riser 11, and two positioning decks 12 horizontally protruding from the opposite edges of the riser and forms a U shape, and said positioning decks are separately arrayed with a first positioning hole 13 and a second positioning hole 14, wherein the first positioning hole 13 has a spiral circumference while the second positioning hole 14 has a smooth one; additionally, the brace 10 has a positioning bearing 16 for screwing into the second positioning hole 14, wherein the center of the positioning bearing 16 is placed with a blind hole 17 opening toward the inner of the brace 10 as shown in FIG. 1 to FIG. 3.

The thread rod 20 mainly has a rod body 21 for passing through the first positioning hole 13 and the second positioning hole 14; one end of the thread rod 20 is inserted into the blind hole 17 of the positioning bearing 16 being relatively rotatable to the brace 10. In the center part of the rod body 21 has a screw section 22 and, at the same time, one end of the rod body 21 has a circle notch 23 near the first positioning hole 13. In this embodiment, the circle notch 23 is mounted by the rim of the screw section 22, and the technicians engaged in related art may relocate the circle notch 23 as per the desire. Besides, the thread rod 20 has a C shape thrust washer 24 for clutching the circle notch 23 in order to shift the thread rod 20 and the thrust washer 24 synchronously.

The thread bearing 30 is a hollow cylinder for gripping one end of the thread rod 20 and screwing onto the first positioning hole 13. On the periphery of the thread bearing 30 has a screw portion 31 for matching to the spiral circumference of the first positioning hole 13, and a flange 32 has an outer diameter bigger than the outer diameter of the screw portion 31. Hence, when the thread bearing 30 is screwing into the first positioning hole 13, the bottom of the thread bearing 30 withstanding against the thrust washer 24 applies force passing through the thrust washer onto the thread rod and shifting the movement of the thread rod. Besides, the flange 32 has a pair of convex clamping yokes 33 for users to rotate at ease with bare hands or other tools.

Apart from foresaid components, this embodiment further provides a slide block 40 winded on the thread rod 20 for changing the moving way of the thread rod 20 from a helical cycle to a linear fashion; said brace 10 is even equipped with a guide rod 18 set into two bores 15 of the positioning decks 12 for restraining said slide block 40 from spin.

Hereafter to deliberate the assembly steps of the thread rod assembly. Firstly, insert the thrust washer 24 into the thread rod 20. Secondly, traverse one end of the thread rod 20 in sequence into the first positioning hole 13, the slide block 40, and the positioning bearing 16 and ensuring the thread rod with mobility retained. Finally, install the thread bearing 30 onto the other end of the thread rod 20, screw the thread bearing 30 onto the first positioning hole 13 and ensure the deposition of the thread rod 20 being between the thread bearing 30 and the positioning bearing 16. In the end, all of assembly steps is simple and fast completed.

Once the assembling is done, the thread rod 20 is inserted into one side of the positioning bearing 16 and attached to the blind hole 16 so as to be shifted a minute moving. As one end of the thread bearing 30 withstands against the thrust washer 24, the user may employ the flange 32 and the clamp yokes 33 of the thread bearing 30 to rotate the thread bearing 30 in a clockwise or counterclockwise direction bringing the thread bearing 30 to be closer or farther toward the inner of the brace 20; at the same time, by applying force passing through the thrust washer onto the thread rod and shifting an axial moving of the thread rod for fine tuning the distance D between the thrust washer 24 and the positioning decks 12 which realizes the adjusting axial gap distance of the thread rod as shown on FIG. 3.

To sum up, it is quite obvious that the assembly steps of this invention is so simple that the user may easily tune the distance of the axial gap of the thread rod assembly just by rotating the thread bearing 30.

What is claimed is:

1. A thread rod assembly with an adjustable axial gap comprises:
    a brace, having a first positioning hole with spiral circumference;
    a thread rod, having a screw section and a thrust washer, wherein the thread rod passes through the first positioning hole and is rotatable installed into the brace; and
    a thread bearing, being a hollow cylinder for gripping an end of the thread rod located in the first positioning hole, wherein the thread bearing has a screw portion on its outer circumference for screwing into the first positioning hole leading a bottom of the thread bearing to withstand against said thrust washer;
    wherein the brace has a raiser and two positioning decks protruding from opposite edges of the raiser, the positioning decks are separately arrayed with the first positioning hole and a second positioning hole, and an inner circumference of the second positioning hole is smooth;
    wherein the brace has a positioning bearing deployed onto the second positioning hole and the thread rod is deployed between the thread bearing and the positioning bearing.

2. The thread rod assembly with an adjustable axial gap as defined in claim 1, wherein the thread bearing has a flange with an outer diameter bigger than an outer diameter of the screw portion.

3. The thread rod assembly with an adjustable axial gap as defined in claim 2, wherein the flange has a pair of convex clamping yokes.

4. The thread rod assembly with an adjustable axial gap as defined in claim 1, wherein the thread rod has a circle notch which is clutched by the thrust washer, wherein the thrust washer has a C shape.

5. The thread rod assembly with an adjustable axial gap as defined in claim 1, wherein a center of the positioning bearing has a blind hole for insertion of the thread rod.

6. The thread rod assembly with an adjustable axial gap as defined in claim 1, wherein a guide rod set into two bores of the positioning decks.

7. The thread rod assembly with an adjustable axial gap as defined in claim 6, wherein a slide block winded on the thread rod.

* * * * *